United States Patent
Boorman

(10) Patent No.: US 6,860,388 B2
(45) Date of Patent: Mar. 1, 2005

(54) OPTICAL DISC HOLDER

(76) Inventor: Gregg M. Boorman, 9470 Dillon Ct., Durham, CA (US) 95938

( * ) Notice: Subject to any disclaimer, the term of this patent is extended or adjusted under 35 U.S.C. 154(b) by 0 days.

(21) Appl. No.: 10/251,098

(22) Filed: Sep. 20, 2002

(65) Prior Publication Data

US 2004/0055910 A1 Mar. 25, 2004

(51) Int. Cl.[7] .............................................. B65D 85/57
(52) U.S. Cl. ................................... 206/308.1; 206/509
(58) Field of Search ............................... 206/15, 305.1, 206/308.3, 309, 310, 312, 499, 303, 563, 564, 506, 509, 308.1

(56) References Cited

U.S. PATENT DOCUMENTS

| | | | | |
|---|---|---|---|---|
| 1,683,440 A | * | 9/1928 | Bodwell et al. .............. 206/15 |
| 2,285,139 A | | 6/1942 | Andres | |
| 3,169,682 A | | 2/1965 | Hollingsworth | |
| 3,259,231 A | | 7/1966 | Romanowski et al. | |
| 3,961,656 A | * | 6/1976 | Aggarwal ................... 206/312 |
| 4,120,398 A | * | 10/1978 | Braddon, Sr. .............. 206/408 |
| 4,148,491 A | | 4/1979 | Stark et al. | |
| 4,736,840 A | * | 4/1988 | Deigimeier ................. 206/313 |
| 4,879,710 A | * | 11/1989 | Iijima ......................... 369/291 |
| 4,899,330 A | | 2/1990 | Einhaus | |
| 4,983,437 A | | 1/1991 | Merrick | |
| 5,669,494 A | | 9/1997 | Geffen | |
| 5,757,765 A | | 5/1998 | Chen | |
| 6,012,574 A | * | 1/2000 | Ennis ....................... 206/308.1 |
| 6,112,894 A | | 9/2000 | Kikuchi et al. | |
| 6,446,807 B1 | * | 9/2002 | Lafond et al. .............. 206/456 |

* cited by examiner

Primary Examiner—Shian T. Luong
(74) Attorney, Agent, or Firm—Dean A. Craine

(57) ABSTRACT

An optical disc holder made of molded elastomeric material designed to protect the recorded side of the optical disc and provide a convenient storage method. The holder includes a flat, circular body with a circular central region and a raised perimeter edge, and three radially aligned tabs. The central region is slightly smaller in diameter than an optical disc so that the body snap fits around an optical disc. Formed on each tab is a curved slot that engages the perimeter edge of the optical disc when the optical disc is inserted over the central region of the body. Formed on opposite surfaces of each tab is a raised lip structure and a recessed surface that are engaged with adjacent disc holders to hold stacked disc holders together.

8 Claims, 2 Drawing Sheets

OPTICAL DISC HOLDER

BACKGROUND OF THE INVENTION

1. Field of the Invention

This invention relates to covers or jackets designed to protect and hold optical discs. More particularly, it relates to protective covers or jackets made of resilient, pliable material that enable multiple optical discs to be vertically stacked and nested together.

2. Description of the Related Art

This invention is a new type of optical disc holder or storage device, which solves the problems of the packaging currently available to the public. The current art in packaging of CDs and DVDs can be divided into three basic categories: (a) retail acrylic box, (b) retail cardboard or heavy paper, and (c) aftermarket sleeve cases. Retail acrylic cases are typically the original packaging for most audio and information diskettes, whereby the producer can display inlayed paper graphics from within the clear acrylic case. Acrylic cases are well suited for graphic display and product stacking. However, they are brittle and break easily. Retail cardboard or heavy paper packages are actually more durable than the acrylic cases. However, the cardboard or heavy paper packages do not stack well and are prone to tearing, wrinkling, bending, and surface wear. Acrylic and cardboard cases are both considered disposable by the public. Aftermarket sleeve cases have from a need for durable, space efficient storage, whereby the discs are kept safe, secure, clean, and easily accessible. They are available in a variety of styles and sizes, both with hard shell and soft fabric outer covers. Aftermarket sleeve cases are currently the most accepted method of storage for compact discs, especially audio compact discs. There are many different styles of sleeves and cases now on the market. The dilemma is what to do with a single disc at a work station, in transit, being exchanged, lent to a friend, hand carried, or shipped. Usually, the disc sleeve stays in the case and the CD or DVD is transported bare, where it can be exposed to heat, abrasion, or being lost.

SUMMARY OF THE INVENTION

It is an object of the present invention to provide an inexpensive, lightweight shipping container that can also be used as a protective holder for an optical disc, such as a CD or DVD disc.

It is another object of the present invention to provide such a holder that can be easily attached to and detached from the optical disc.

It is another object of the present invention to provide such a holder that can be nested and vertically stacked with a plurality of holders.

These and other objects are met by the optical disc holder disclosed herein that includes a body designed to cover the media recorded side of an optical disc. The body is a thin, flat, circular structure with a circular central region and three outward extending, radially aligned tabs formed thereon. Formed centrally on the body is an optional, raised support structure that supports the center spindle area of the optical disc when disposed over the central region. The body includes a raised perimeter edge that snap-fits around the perimeter edge of the optical disc when aligned and registered over the central region. Formed inside each tab is a curved slot that receives the perimeter edge of the optical disc to hold the optical disc on the body. Formed on the top and bottom surfaces of each tab are at least one recessed surface and at least one complementary-shaped projecting element, respectively. During use the recessed surfaces and projecting elements on stacked disc holders are interconnected to hold adjacent disc holders in a stacked configuration.

During use, the body easily snap fits around an optical disc to provide a protective cover. The bodies are relatively thin and require very little space. The bodies also enable the optical discs to be stacked together by interconnecting the projecting elements and recessed surfaces on adjacent disc holders.

DESCRIPTION OF THE PREFERRED EMBODIMENT(S)

Figure 1:
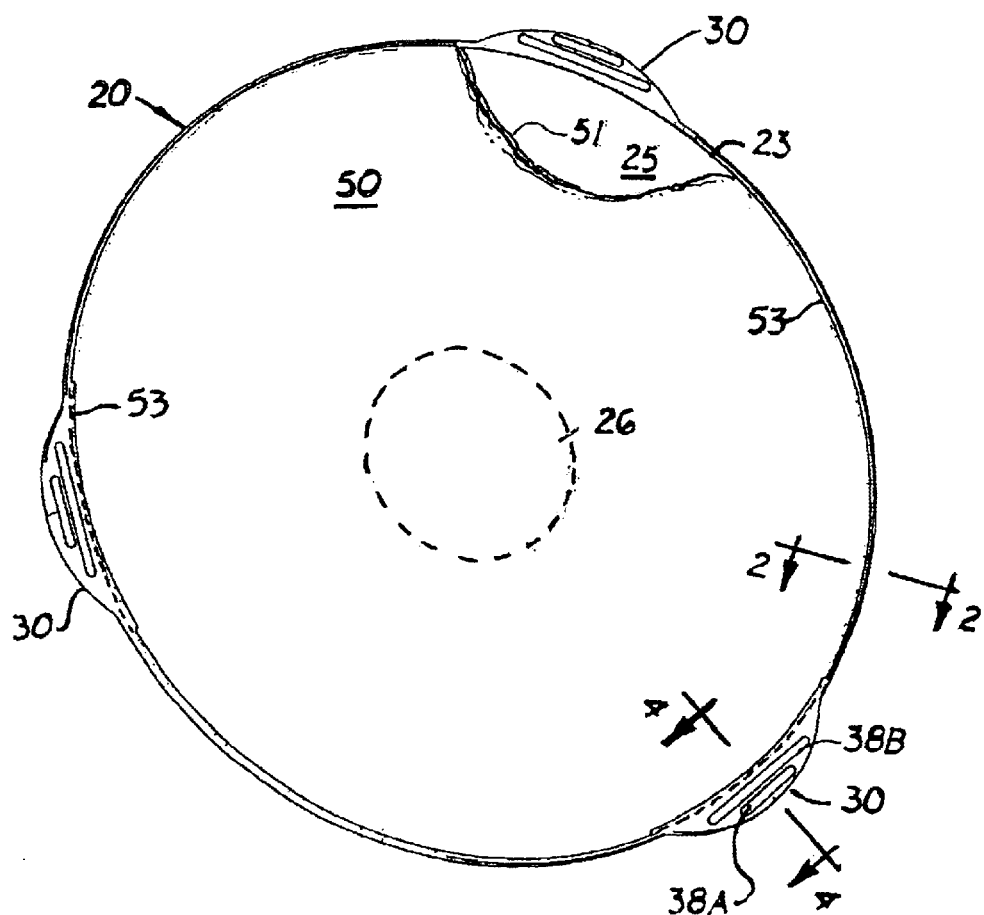
FIG. 1 is a perspective view of an optical disc placed on the optical disc holder.
Figure 2:
FIG. 2 is a sectional, side elevational view taken along line 2—2 in FIG. 1.
Figure 3:
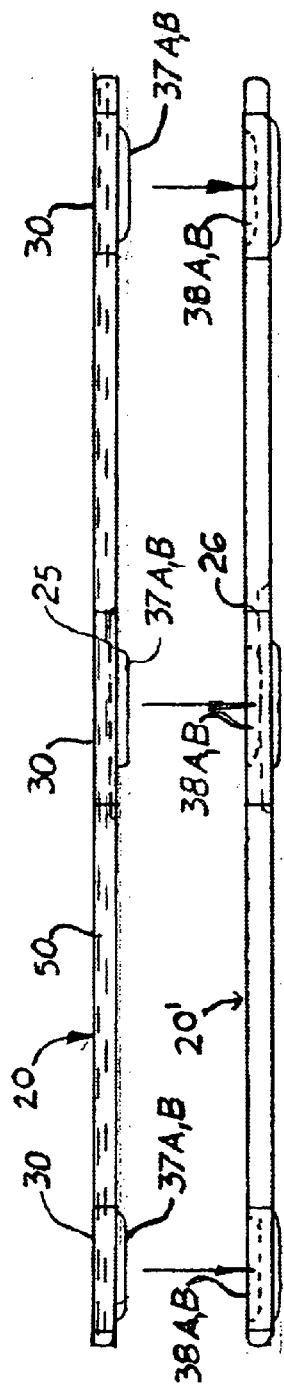
FIG. 3 is a side elevational view of two stacked optical disc holders being interconnected.
Figure 4:
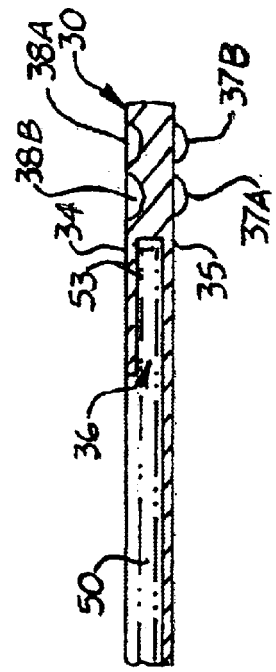
FIG. 4 is a sectional side elevational view taken along line 4—4 in FIG. 1.
Figure 5:
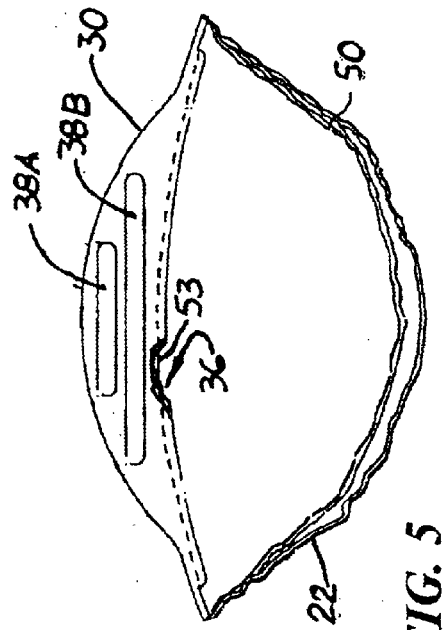
FIG. 5 is an exploded top plan view of a section of an optical disc inside a tab.

Shown in the accompanying Figs., there is shown a lightweight, inexpensive, optical disc holder, generally referenced as 20, designed to snap-fit around the perimeter edge 53 of an optical recorded disc 50 to protect the optical disc 50 during storage and transport. The holder 20 is specifically designed to capture the perimeter edge 53 the optical disc 50 and protect the disc recorded surface 51 from scratches or impacts. The holder 20 is also designed to provide a means for stacking optical discs 50 together.

The holder 20 includes a thin, flat body 22 with a circular, central region 25 surrounded by three laterally extending, radially aligned tabs 30. Formed on the central region 25 is a raised perimeter edge 23. The central region 25 is slightly smaller in diameter than the optical disc 50 so that the body 22 stretches when an optical disc 50 is placed inside the central region 25 and the optical disc perimeter edge 53 presses against the raised perimeter edge 23. Formed centrally on the central region 25 is a raised support structure 26 that presses against the disc spindle receiving area to suspend the optical disc 50 on the body 22.

Formed on the body 22 are three radially aligned, equally spaced apart tabs 30. Formed in each tab 30 is a circular slot 36 that captures the perimeter edge 53 of an optical disc 50 to hold the optical disc 50 on the body 22. Formed on the top and bottom surfaces 34, 35, respectively, of each tab 30 are at least one projecting element 37A or 37B and at least one complementary-shaped recessed surface 38A or 38B. During use, stacked disc holders 20, 20' are registered and aligned so that the projecting elements 37A, 37B and recessed surfaces 38A, 38B interconnect to hold the disc holders 20, 20' in a stacked configuration. In the preferred embodiment shown in the Figs, there are two projecting elements 37A, 37B and two recessed surfaces 38A, 38B on each tab 30.

During use, the holder 20 is held in one hand so that the optical disc 50 may be aligned and pressed over the central region 25. Alternatively, the optical disc 50 may be placed on a flat surface with the body 22 aligned over the optical disc 50 so that when the support structure 26 is forced inward toward the optical disc 50, a suction force is created inside the body 22 that pulls the optical disc 50 into the body central region 25. The optical disc 50 can be released from the holder 20 by simply flexing back the raised perimeter edge 23 of the body 22 to sufficiently distort the slots 36 thereby allowing them to disengage the perimeter edge 53 from the slots 36.

In the preferred embodiment, the body 22 is made of thermo-plastic rubbers, such as styrene and olefin blocked polymers, or thermoplastic elastomers, such as ethylene, polypropylene, vinyl, and urethane based polymers. Olefin, ethylene, EVA or PVC foams may be used as well. All of the above materials are injection moldable. In the preferred embodiment, the thermo-plastic material has a durometer of 5 to 100 measured in Shore-A scale and a specific gravity between 0.100 and 1.50.

In the preferred embodiment, the body 22 is approximately 0.6 inch thick and approximately 5.5 inches in diameter. The diameter of the central region 25 is between 4.75 and 5.00 inches. The tabs 30 are approximately 1 inch in length and extend approximately 3/8 inch from the perimeter edge 23 of the body 22. The projecting elements 37A, 376 are approximately 1/8 inch in width, 1/2 and 3/4 inch in length, respectively. The recessed spaces 38A, 38B are approximately 1/2 and 3/4 inch in length, respectively, and 1/16 inch in depth.

In compliance with the statute, the invention described herein has been described in language more or less specific as to structural features. It should be understood, however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. An optical disc holder, comprising:
   a. a body having a central region slightly smaller in diameter than an optical disc, said body being made of a flexible material; and,
   b. at least two outward extending tabs formed on said body, each said tab including at least one raised projecting element formed on one surface and an opposite complementary-shaped recessed surface, each said tab also including a curved slot capable of receiving a perimeter edge of an optical disc when the optical disc is placed onto said central region of said body.

2. The optical disc holder as recited in claim 1 wherein said body has a durometer of 5 to 100 measured in ShoreA scale.

3. The optical disc holder as recited claim 1 wherein said body is made of thermo-plastic material with a specific gravity between 0.100 and 1.50.

4. The optical disc holder as recited in claim 1, wherein said body is made of transparent material.

5. The optical disc holder as recited in claim 1, where there are three radially aligned tabs formed on said body.

6. The optical disc holder as recited in claim 1, wherein said body is made of thermo-plastic material.

7. The optical disc holder as recited in claim 1, wherein said body is injection molded.

8. An optical disc holder, comprising:
   a. a body having a central region slightly smaller in diameter than an optical disc, said body being made of a flexible material; and,
   b. three radially aligned tabs, each said tab including at least one raised projecting element formed on one surface and an opposite complementary-shaped recessed surface, each said tab also including a curved slot to receive a perimeter edge of an optical disc when placed onto said central region of said body.

* * * * *